United States Patent [19]
Horski

[11] Patent Number: 5,434,463
[45] Date of Patent: Jul. 18, 1995

[54] DIRECT CURRENT MOTOR WITH CRESCENT SHAPED BRUSHES

[75] Inventor: Marek Horski, London, Canada

[73] Assignee: Siemens Electric Limited, London, Canada

[21] Appl. No.: 231,555

[22] Filed: Apr. 21, 1994

[51] Int. Cl.[6] .................................. H02K 13/00
[52] U.S. Cl. .................... 310/248; 310/90; 310/136; 310/148; 310/216; 310/233; 310/261
[58] Field of Search .............. 310/136, 138, 239, 242, 310/244-247, 89, 261, 233, 248, 249, 90, 216, 148

[56] References Cited

U.S. PATENT DOCUMENTS

| | | | |
|---|---|---|---|
| 2,481,499 | 9/1949 | Collura | 310/239 |
| 4,638,204 | 1/1987 | Kirchner | 310/239 |
| 4,910,790 | 3/1990 | Kershaw | 310/138 |
| 4,994,699 | 2/1991 | Shiina | 310/89 |
| 5,006,747 | 4/1991 | Stewart, Sr. | 310/239 |
| 5,010,266 | 4/1991 | Uchida | 310/261 |
| 5,039,897 | 8/1991 | Iwamatsu | 310/261 |
| 5,237,231 | 8/1993 | Blaettner | 310/239 |

*Primary Examiner*—R. Skudy
*Attorney, Agent, or Firm*—Russel C. Wells

[57] ABSTRACT

A single speed, two pole permanent magnet motor has compact brush card assembly mounted within the volume form by a plurality of ring shaped laminations forming the armature to allow the height of the motor to much less than a standard motor. In addition, there is shown a two speed, four pole permanent magnet motor having a height much less than a standard two speed motor. In each motor there are electrically connected to the supply lines a choke means and across each supply line is a capacitor for suppressing radio frequency interference.

5 Claims, 4 Drawing Sheets

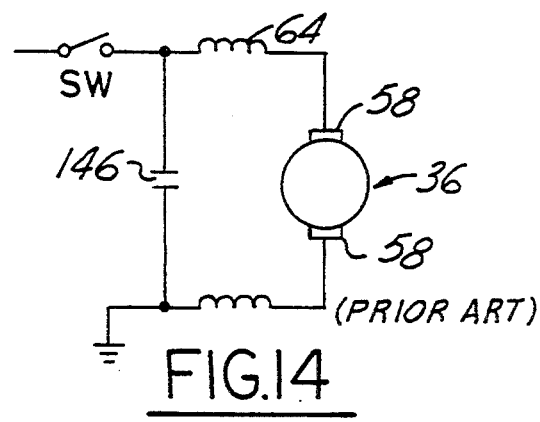
FIG.15 (PRIOR ART)
FIG.14 (PRIOR ART)
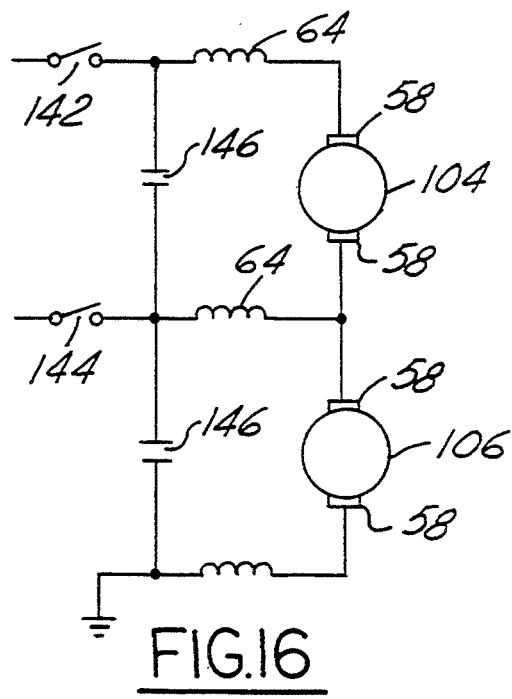
FIG.17
FIG.16

DIRECT CURRENT MOTOR WITH CRESCENT SHAPED BRUSHES

This invention relates to a direct current motors in general and more particularly to brush cards for one and two speed four pole permanent magnet motors having crescent shaped brushes.

BACKGROUND OF THE INVENTION

Prior Art

The most conventional type of brushes for direct current, "d.c.", motors is a straight brush. Examples of which are found in several U.S. Patents such as U.S. Pat. No. 5,006,747, entitled "Dynamoelectric Machine Brush Rigging and Method of Assembly". U.S. Pat. No. 4,596,941, entitled "Electric Motor", illustrates brushes affixed to spring levers resiliently mounted on the end wall of the motor. This is still a straight brush.

Another type of brush is called the hammer brush and is illustrated by U.S. Pat. No. 4,638,204 entitled "Hammer Brush Holder Assembly for a Commutator Motor" issued on Jan. 20, 1987 by Siemens Aktiengesellschaft. This brush is mounted in a brush holder that is pivoted to bring the brush into contact with the commutator. The brush is a curved to follow the pivoting arc of the moveable brush holder.

Summary of Invention

It is a principle advantage of the motor to reduce the overall height or width of the motor for applications wherein the motor length or width is an advantage.

It is another advantage of the motor maintain the pressure of the brushes on the commutator over the life of the motor.

It is still another advantage to provide a two speed, four pole motor wherein the brushes are substantially contained within the armature laminations.

It is still another advantage to provide curved or crescent shaped brushes and maintain brush pressure constant during the life of the brushes.

These and other advantages will become apparent in the following detailed description.

A direct current permanent magnet motor having a housing open at one end and having an aperture centrally located in the closed end supporting a bearing member. The end bell of the motor is adapted to enclose the open end of the housing. Centrally located in the end bell is a bearing means adapted to be aligned with the bearing member at the closed end of the housing. A spring means locates and maintains the bearing means in the end bell. An armature means which includes an armature shaft rotatably mounted in the bearing means at one end and the bearing member in the housing intermediate the ends of the shaft, a commutator mounted on the armature shaft, and an armature including armature windings.

A brush card means has at least one pair of diametrically opposed brush means each having a brush, is mounted in the end bell and positioned so that the brushes are in contact with the commutator. The brush card means comprises an electrically non-conductive base member having a central aperture with a diameter larger than the diameter of the commutator. The base member supports the at least one pair of brush means within its outer periphery. The brush means has an arcuate brush tube for retaining and guiding an arcuate brush. The brushes are each maintained in contact with the commutator by means of a torsion spring mounted to the base member for biasing each of the brushes in an arcuate direction toward the commutator.

In a second embodiment, there is illustrated a two speed, four pole motor wherein the brush card contains brushes for each speed within the periphery of the ring shaped armature. Thus this motor is also reduced in height or width.

DETAILED DESCRIPTION OF THE DRAWINGS

In the drawings::

FIG. 14 is prior art electrical schematic of the control of the motor of FIG. 1;

FIG. 15 is a truth table for the control of the motor of FIG. 14;

FIG. 16 is prior art electrical schematic of the control of the motor of FIG. 10; and FIG. 17 is a truth table for the control of the motor of FIG. 16.

DETAILED DESCRIPTION

Figure 1:
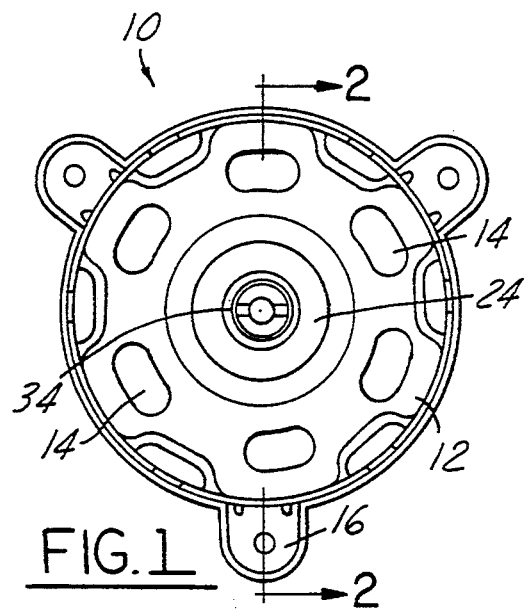
FIG. 1 is a plan view of a two pole, single speed permanent magnetic motor of the preferred embodiment.

Referring to the drawings by the characters of reference there is illustrated in FIG. 1 a plan view of a single speed, two pole permanent magnet motor 10. The housing 12 of the motor is essentially tubular shaped and enclosed at one end. As shown in the end of the housing 12 are a plurality of holes 14 which function to allow the passage of air into and out of the interior of the housing. Illustrated are three mounting brackets 16 which are connected to or formed from an end bell 18 of the motor 10.

Figure 2:
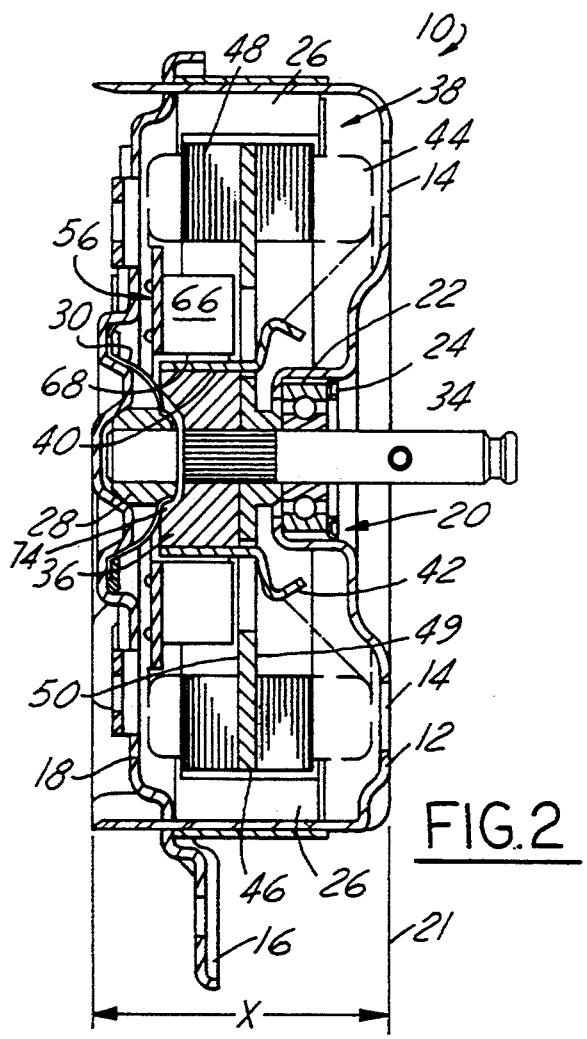
FIG. 2 is a sectional view of the motor of FIG. 1 taken along line 2—2 of FIG. 1.

Referring to FIG. 2 there is illustrated in section the direct current motor 10 of FIG. 1 having a U-shaped 12 open at one end and an aperture 20 centrally located in the closed end. As shown, the aperture is contained in a pocket of the housing 12 which is formed to be inside the plane 21 formed by the end of housing 12. Supported in the aperture 20 is a bearing member 22 which is illustrated as a ball bearing, and a spring member 24 to hold the bearing member in place. Mounted along the inside of the housing 12 are a plurality of permanent magnets 26, for providing the magnet flux of the motor 10.

An end bell 18 encloses the housing 12 at its open end and in the preferred embodiment has the plurality of mounting brackets 16 connected to or formed thereof which function to support the motor in its application. The end bell 18 has a bearing means 28, illustrated as a solid bearing formed from a bearing material, which is centrally located and is aligned with the bearing member 22 in the aperture 20 at the closed end of the housing 12. A spring means 30 for locating and maintaining the bearing means 28 is supported in the end bell 18 and in particular is located in a well in the end bell.

Figure 4:
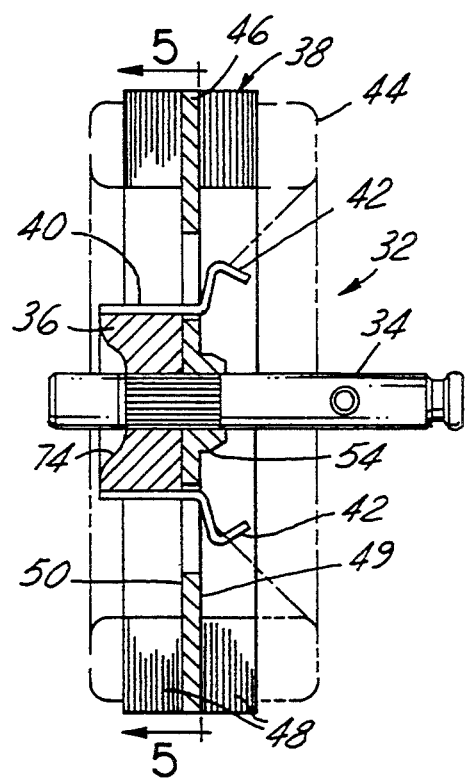
FIG. 4 is a section view of the armature assembly of the motor of FIG. 1.

An armature means 32, as illustrated in FIG. 4, including an armature shaft 34, a commutator 36, and an armature 38, is supported for rotation by the bearing member 22 and the bearing means 28. Mounted on the armature shaft 34 and between the bearings is the commutator 36 having a plurality of commutator bars 40 each with a hook means 42 for connecting each bar of the commutator 36 to a winding coil 44 in the armature 38. The hook means 42 are illustrated in a reverse direction, compared to conventional hook means, to allow a more compact motor width or height "X" in FIG. 2.

Figure 5:
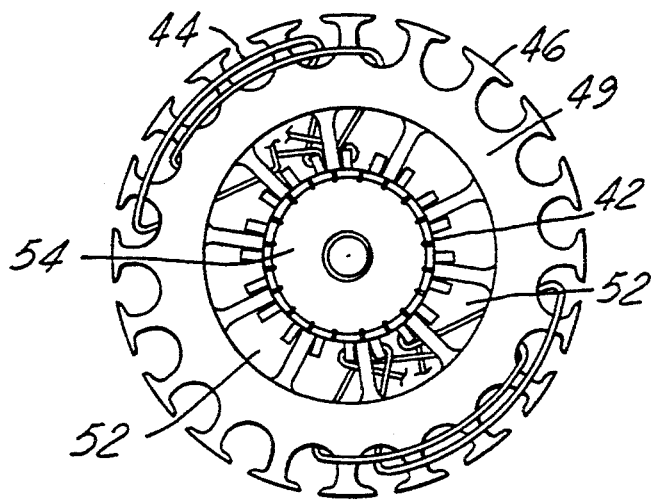
FIG. 5 is a plan of the armature web taken along line 5—5 of FIG. 4.

Also mounted on the armature shaft is a web member 46, as illustrated in FIG. 4, supporting the laminations 48 of the armature 38. The laminations 48 are ring-shaped and are mounted on both flat surfaces 49–50 of the web member 46 with an equal number of laminations on both sides of the web member for balancing the armature, as shown in FIG. 4. If the number of laminations is not equal, a balancing weight, not shown, may be added to the short stack of laminations for balancing. As illustrated in FIG. 5, the web member 46 has a plurality of radially extending slots 52 extending from the hub 54 to allow the hook means 42 from the commutator 36 to extend therethrough.

Figure 3:
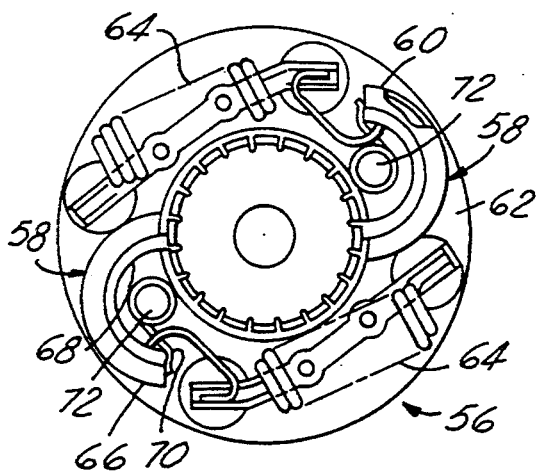
FIG. 3 is a plan view of the brush card assembly of the motor of FIG. 1.

The brush card means 56, as illustrated in FIG. 3, is mounted in the end bell 18 and has at least one pair of diametrically opposed brush means 58 mounted on an electrically non-conductive base member 60. As shown, there are two pair of brush means mounted to the brush card means 56. The base member 60 has a central aperture 62 with a diameter larger than the diameter of the commutator 36, thereby allowing the commutator to extend therethrough. In the preferred embodiment, the base member 60 is substantially circular in shape and supports the pair of brush-means 58 inside the outer periphery or circumference of the base member. As illustrated in FIG. 3, the brush card means 56 additionally includes choke means 64 electrically connected for reducing electromagnetic interference.

Figure 6:
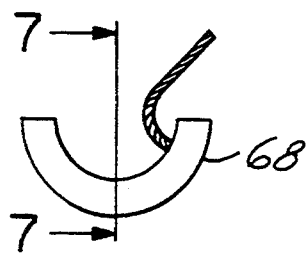
FIG. 6 is plan view of the brush.
Figure 7:
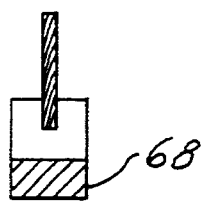
FIG. 7 is a sectional view taken along line 7—7 of FIG. 6.
Figure 8:
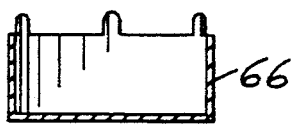
FIG. 8 is an elevation view of the brush tube taken in the direction of arrow 8 in FIG. 9.
Figure 9:
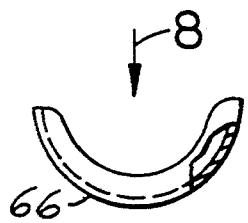
FIG. 9 is a plan view, partially in section, of the brush tube.

The brush means 58 comprises a round shaped brush tube 66, illustrated in FIGS. 8–9, having a crescent shaped or arcuate shaped brush 68, illustrated in FIGS. 6–7, supported therein. The brush card means 56 is positioned so that the brushes 68 are in contact with the commutator 36. The arcuate brush tube 66 retains and guides the crescent shaped brush 68 to remain in contact with the commutator 36. This is illustrated in FIG. 3. Mounted on the base member 60 is a torsion spring 70 for biasing each of said brushes 68 in an arcuate direction toward the commutator 36. The torsion spring 70 is located on a post 72 which is proximate the center of the arc of the brush 68. In this manner, as the brushes 68 wear, the torsion spring 70 will apply the same amount of pressure to the brush during the time the brush is wearing out.

As illustrated in FIG. 4, the commutator 36 is mounted adjacent to the hub 54 and substantially within the cylinder formed by the ring shaped armature 38. By so doing, this allows the height, X, of the motor 10 to be reduced. The brush card means 56 which is mounted to the end bell 18, is nestled in and is substantially contained within the inner volume formed by the ring shaped laminations 48 of the armature 38. As illustrated in FIG. 2, the commutator 36 maybe formed to provide a pocket 74 for the bearing means 28 in the end bell 18 in order that the bearing means extends further into the motor 10 to reduce the height, X, of the motor.

Referring to FIGS. 14 and 15, there is an electrical schematic and truth table respectively, of a two pole, single speed motor of the present invention. This schematic and truth table are well known.

Figure 10:
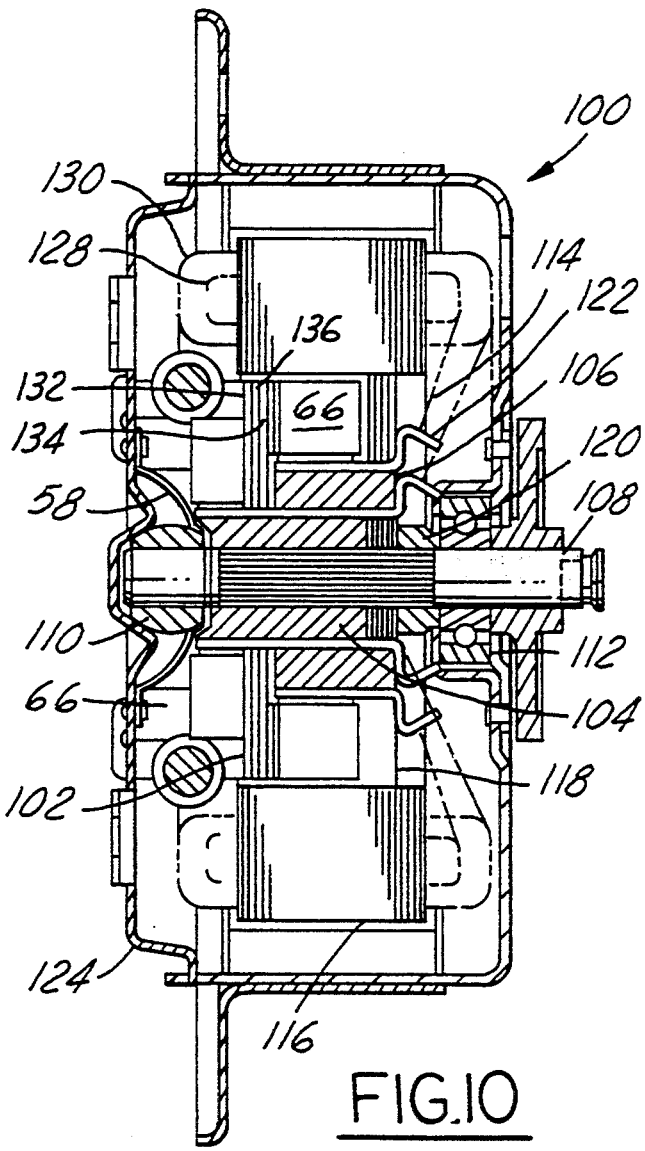
FIG. 10 is a sectional view, similar to FIG. 2, of a four pole, two speed permanent magnetic motor of an alternate embodiment.

Referring to FIG. 10, there is illustrated a four pole two speed motor 100. The basic four pole, two speed motor is described in U.S. Pat. No. 4,910,790, ('790), issued on Mar. 20, 1990 to Kershaw and is assigned to a common assignee. The brush card means 102 in this embodiment is illustrated in FIGS. 11–14.

The two speed, direct current motor 100 includes a first and a second commutator 104, 106 mounted on the armature shaft 108 with the second commutator 106 overlying and insulated from the first commutator 104. The commutators are mounted on the armature shaft 108 intermediate the bearing means 110 and the bearing member 112. As illustrated, the armature means 114 comprises a plurality of ring shaped laminations 116 mounted to a web member 118 having a central hub 120 for mounting on the armature shaft 108 intermediate the first commutator 104 and the bearing member 112. The web member 118 is illustrated as a plurality of flat members each having a plurality of radially extending slots extending from the hub 120 through which the hook means 122 from each commutator 104, 106 extends.

Figure 11:
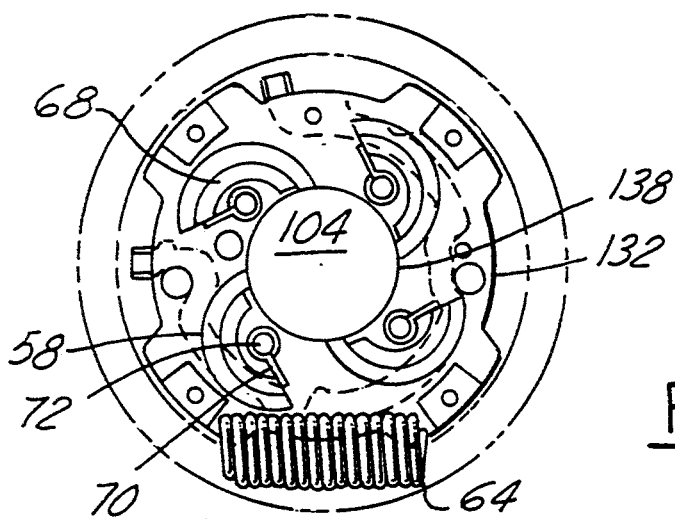
FIG. 11 is a plan view of the low speed brush card assembly of the motor of FIG. 10.

Mounted to the end bell 124 of the motor 100 of FIG. 10, is the brush card means 102 having a first, second and third base members 132, 134, 136: The first base card member 132 is similar to that illustrated in FIG. 4 and is illustrated in FIG. 11. The first base card member 132 is electrically active when the four pole two speed motor is being operated at its lower speed and the third base card member 134 is electrically active at the higher speed.

The first base member 132 is illustrated in FIG. 11. The diameter of the first aperture 138 in the first base member 132 is larger than the diameter of the first commutator 104. The first base member supports two pair of brush means 58 inside the outer periphery of the first base member. Illustrated are two pairs of brush means 58 on the base member 132. The brush means 58 has an arcuate brush tube 66 for retaining and guiding an arcuate or crescent shaped brush 68 and a torsion spring 70 mounted on a spring post 72 to the first base member 132 for biasing each of the brushes 68 in an arcuate direction toward the first commutator 104. The first base member supports a choke means 64.

Figure 13:
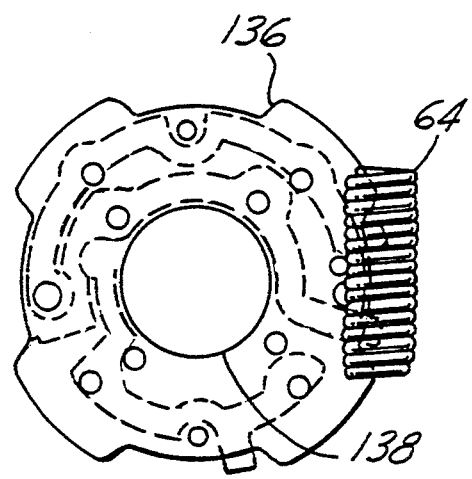
FIG. 13 is a plan view of the common brush card assembly of the motor of FIG. 10.

The third base member 136 is illustrated in FIG. 13. The diameter of the first aperture: 138 in the second base member 136 is larger than the diameter of the first commutator 104. The second base member 134 is the negative, common or ground electrical member and receives the common electrical connection. Mounted to the second base member is a choke means 64.

Figure 12:
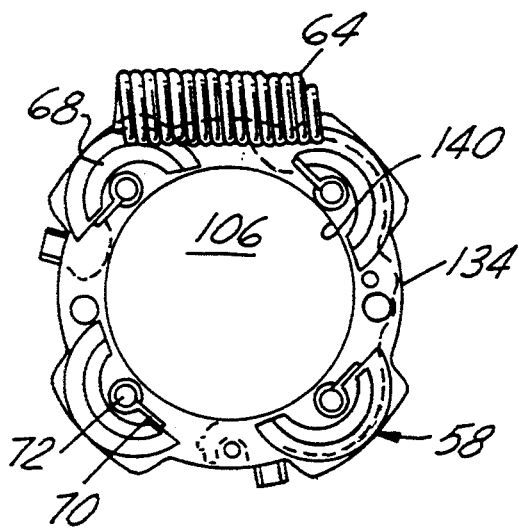
FIG. 12 is a plan view of the high speed brush card assembly of the motor of FIG. 1 0.

The second base member 134 is illustrated in FIG. 12. The diameter of the aperture 140 in the third base member 134 is larger than the diameter of the second commutator 106. The third base member supports two pair of brush means 58 inside the outer periphery of the third base member. The brush means 58 has an arcuate brush tube 66 for retaining and guiding the arcuate or crescent shaped brush 68 and a torsion spring 70 mounted on a spring post 72 to the third base member 134 for biasing each of the brushes 68 in an arcuate direction toward the second commutator 106. Mounted to the third base member is a choke means 64.

The brush card means has 102 places the second or negative brush card 136 between the first 132 and third 134 base members. This is illustrated in FIG. 10. Together the three brush cards form a laminated brush card means 102.

Since this motor has two commutators 104, 106, the axial length of the commutators is longer than that of the motor 10 shown in FIG. 2. Therefore the web member 118 does not have the same number of laminations 116 secured to each face of the web member. The side of the web member 118 with the larger stack of laminations 116 allows the brush card means 102 to be positioned so that the brush means 58, which rides on the second commutator 106, is within the volume formed by the ring shaped armature laminations 116.

As taught in the '790 patent, there are two layers 128, 130 of armature windings wound through the laminations 116. The inner layer 128 of windings is connected to the second commutator 106 for high speed operation and the outer layer 130 of windings is connected to the first commutator 104 for the lower speed operation.

Referring to FIG. 16, the two speed motor 100, may be controlled by a pair of control switches 142, 144 which are mutually exclusive, in that if one is closed the other must be open. This is shown in the truth table of FIG. 17. In fact both switches 142, 144 may be open at the same time but both switches may not be closed or operated at the same time. The power supplied to both switches 142, 144 may be the full voltage of the power supply. The normally open contact of the first switch 142 is electrically connected to one pair of brushes on the low speed or first commutator 104 through the choke coil 64. The second pair of brushes on the first brush card 132 are connected to the second brush card 136. The normally open contact of the second switch 144 is electrically connected to one pair of brushes on the third brush card 140 on the high speed or second commutator 106 through the choke coil 64. The second pair of brushes are connected to the third base member 136. The ground line is connected to the third base member 136; Thus, in order to operate the motor at the second or low speed, the two windings are connected in series with the voltage drop across each winding proportional to the resistance of the winding. When the motor is run at the first or high speed, the power is connected through the second switch 144 and choke 64 to the brushes of the second commutator and the high speed winding. Connected across each supply line are first and second filter capacitors 146 which in cooperation with the three choke coils operates to suppress radio frequency interference.

What is claimed is:

1. A direct current motor having a generally u-shaped housing open at one end and having an aperture centrally located in a closed end, the aperture supporting a bearing member;
    a permanent magnet field;
    an end bell adapted to enclose the housing at its open end;
    bearing means centrally located in the end bell adapted to be aligned with the aperture in the housing;
    spring means for locating and maintaining the bearing means in the end bell;
    armature means including an armature shaft, a first commutator having hook members, and an armature, the armature shaft rotatably mounted in the bearing means at one end and the bearing member in the housing intermediate the ends of the shaft;
    brush card means having at least one pair of diametrically opposed brush means, each having a brush, the brush card means mounted in the end bell and positioned so that the brushes are in contact with the first commutator;
    characterized in that
    said armature comprises a plurality of ring shaped laminations mounted to a web member having a central hub for mounting on the armature shaft intermediate the bearing means and the bearing member;
    said first commutator is mounted adjacent to said hub and substantially within a cylinder formed by said ring shaped laminations of said armature,
    said brush card means comprises an electrically non-conductive base member having an outer periphery and a central aperture with a diameter larger than the diameter of the commutator, the base member supporting the at least one pair of brush means within the outer periphery of said base member and said brush means having an arcuate brush tube for retaining and guiding an crescent brush and a torsion spring mounted to said base member and biasing each of said brushes in an arcuate direction toward the commutator,
    said brush card means is mounted to said end bell and said at least one pair of diametrically opposed brush means is substantially contained within said ring shaped laminations.

2. A direct current motor according to claim 1 additionally including a second commutator having hook members mounted on the armature shaft, said second commutator overlying and insulated from the first commutator.

3. A direct current motor according to claim 2 wherein said brush card means is characterized in that said brush card means comprises a first, second, and third electrically non-conductive base members each having an outer periphery with the first and third base member having a central aperture with a diameter larger than the diameter of the first commutator and the second base member having a central aperture with a diameter larger than the diameter of the second commutator, said first and second base member supports at least one pair of a brush means within the outer periphery of said base members.

4. A direct current motor according to claim 3 wherein each of said first and second base member comprises an arcuate brush tube for retaining and guiding each crescent shaped brush and a torsion spring mounted to each of said base members and biasing each of said brushes in an arcuate direction toward the first and second commutator respectively.

5. A direct current motor according to claim 2 wherein said armature comprises a plurality of ring shaped laminations mounted to said web member having a central hub for mounting on the armature shaft intermediate the first commutator and the bearing member, said web member has a plurality of radially extending slots extending from said hub for receiving said hook members from each of said first and second commutators.

* * * * *